United States Patent [19]

Tawara et al.

[11] Patent Number: 4,841,129

[45] Date of Patent: Jun. 20, 1989

[54] PATTERN RECOGNITION DEVICE

[75] Inventors: Takao Tawara, Kawaguchi; Jun Akedo; Yoshiyuki Iwashita, both of Tokyo, all of Japan

[73] Assignee: Opticon Inc., Orangeburg, N.Y.

[21] Appl. No.: 944,375

[22] Filed: Dec. 19, 1986

[30] Foreign Application Priority Data

Dec. 21, 1985 [JP] Japan .................... 60-288859

[51] Int. Cl.$^4$ .............................. G06K 7/10
[52] U.S. Cl. ................... 235/472; 235/454; 235/462; 235/463; 235/467
[58] Field of Search .............. 235/467, 463, 472, 454, 235/462, 464

[56] References Cited

U.S. PATENT DOCUMENTS 4,575,625 3/1986 Knowles ....................... 235/467

Primary Examiner—A. D. Pellinen
Assistant Examiner—Leon K. Fuller
Attorney, Agent, or Firm—Abelman, Frayne, Rezac & Schwab

[57] ABSTRACT

A scanning device for reading bar codes symbols comprising at least two moveable, preferably rotatably driven, reflective surfaces, such as mirrors, which direct a light source, preferably from a laser, in a scanning pattern towards the object to be scanned. At least one of said reflective surfaces having an associated lens means to modify the light beam associated with its reflective surface, and means adapted to move each of said reflective surfaces and the associated lens into a path adapted to intersect with said beam of light. Means are provided to direct the beam of light outside the scanning device as a sweep beam onto the bar code symbol to be read and optical means and sensing means are provided to collect the light reflected from the bar code symbol and generate data therefrom.

10 Claims, 3 Drawing Sheets

PATTERN RECOGNITION DEVICE

BACKGROUND OF THE INVENTION

The present invention relates to scanning or pattern recognition devices. It is particularly suited to portable hand-held scanning or pattern recognition devices employing light emitted from a coherent light source, such as a laser, in the reading of bar code symbols.

In the last number of years bar code symbols have achieved increased acceptance as a recognition indicia commerical products. This development has been especially significant in identifying various packaged food, which serves to facilitate handling at both the wholesale and retail level. For example, various bar codes readers and laser scanning systems have been developed to decode the bar code symbol pattern into a multiple digit representation which speeds-up the often lengthy supermarket check-out process while, simultaneously, providing an accurate and efficient means for inventory control. These devices are generally fixedly mounted, with the items to be scanned generally moved into position a known distance from the reading beam.

More recently, portable hand-held scanning devices have been developed. A major disadvantage of these hand-held scanning devices for reading bar codes is the rather distinct and severe limitations insofar as scanning distance is concerned, specifically the distance between the bar code and the scanning device within which meaningful pattern recognition can be achieved. The user must aim the beam, which is generally invisible to the human eye, to insure that the object to be scanned is within the acceptable depth of field for proper reading, i.e., the distance over which the image being scanned is sufficiently in focus to be read.

SUMMARY OF THE INVENTION

In accordance with the present invention a scanning device is provided for reading bar codes where the scanner can be held within a range of distances from the bar code, rather than at a prescribed or fixed distance, and meaningful pattern recognition can still be achieved.

The foregoing is generally accomplished by inclusion within the scanning device of at least two moveable, preferably rotatably driven, reflective surfaces, such as mirrors, which direct a light source, preferably from a laser, in a scanning pattern towards the object to be scanned. At least one of said two reflective surfaces has means, such as an associated lens to modify the light beam associated with its reflective surface, and means adapted to move each of said reflective surfaces and the associated lens into a path adapted to intersect with said beam of light. Means are provided to direct the beam of light outside the scanning device as a sweep beam onto the bar code symbol to be read and, further, optical means and sensing means are provided to collect the light reflected from the bar code symbol and generate data therefrom.

Preferably the reflective surfaces are mirrors, with each mirror having an associated lens means, and with at least one of the lens means having a different refractive index from the other of the lens means. Accordingly, the beams of light from the respective mirrors have different focal points and depths of field with respect to the bar code pattern to be read. Preferably, the mirrors and lenses are formed from a single optical block which is mounted for rotation on a rotary drive shaft which is driven by a motor.

Preferably, the arrangement is a self-contained assembly of mirrors and lenses with the scanning device, most beneficially a hand-held scanning device. This permits greater flexibility of use of the device. range of distances and provides significantly improved depth of field.

BRIEF DESCRIPTION OF THE DRAWINGS

FIG. 3b is a cross-sectional view of the rotating mirrors optical block of FIG. 3a;

DETAILED DESCRIPTION OF THE INVENTION

Figure 1:
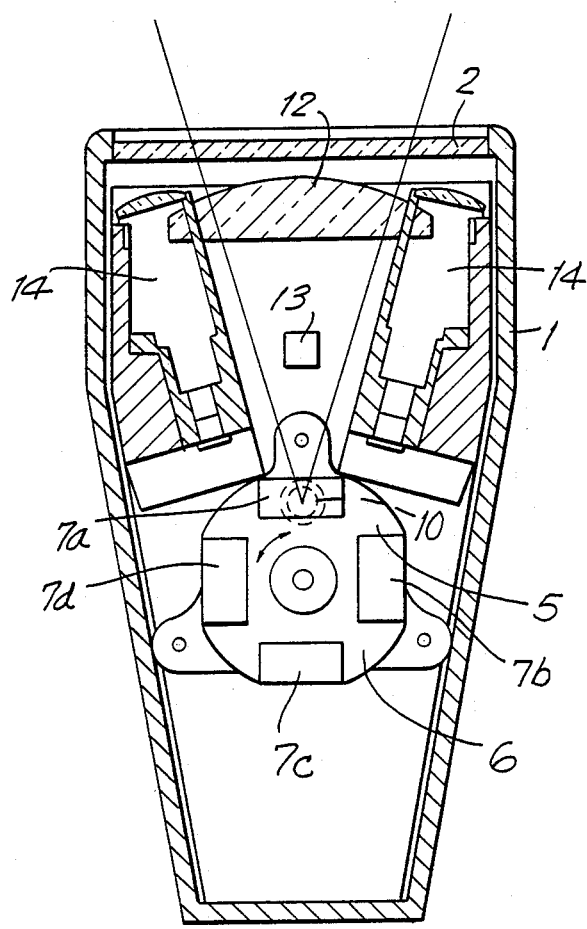
FIG. 1 is a cross-sectional plan view of a hand-held scanning device in accordance with the present invention.
Figure 2:
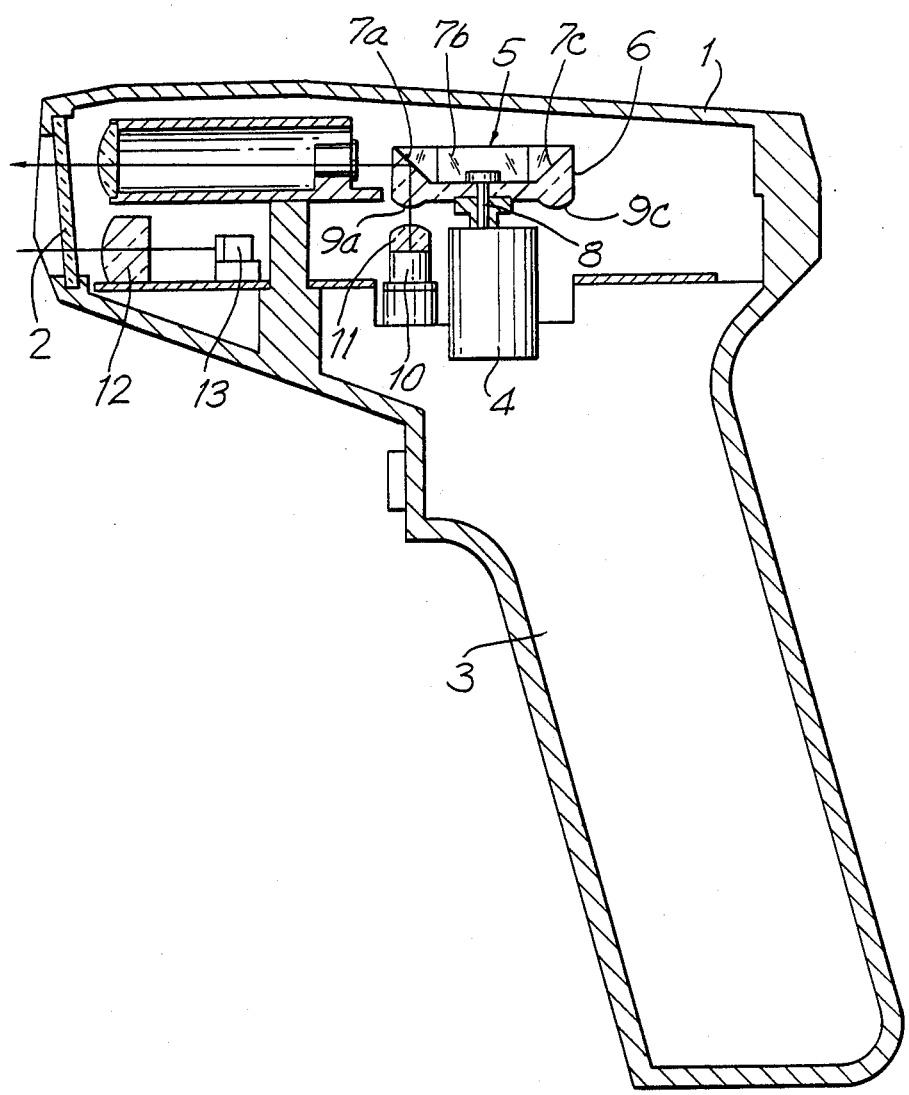
FIG. 2 is a cross-sectional view of FIG. 1 taken from the side.

Referring now to FIGS. 1 and 2 of the drawings, there are depicted cross-sectional schematic views of one form of a device in accordance with the present invention incorporated in a hand-held device. The device comprises a casing or housing 1, having the general configuration of a hand gun, and having a transparent protective window 2 positioned at the front of the housing 1. The lower portion of the housing 1 is provided with a hand-grip 3, similar in configuration to the grip of a hand gun. The basic components required to provide a portable laser scanning device are generally known and the description is limited to those aspects of the invention particularly directed to the improved pattern recognition features. It is to be understood, however, that the basic components include a light source for generating a laser light beam, optic means for directing the light beam towards the bar code symbol to be read, scanning means for sweeping the beam across the symbol, sensing means for detecting the reflected light from the bar code, and, an electrical signal and signal processing means to generate data descriptive of the bar code. For example, the interior of the grip 3 is adapted to accomodate one or more batteries, an analog amplifier, a motor drive and control, a laser drive and control (assuming the light source is a laser), a digitizing circuit, a signal enhancing circuit, a decoder, an encoder and an interface circuit.

Within the housing 1, proximal its upper edge, is mounted a drive means, shown as a motor 4, (preferably of the brushless type to improve its reliability and insure a longer life), having shaft 8. An optical block 6, made of a transparent, optical grade, synthetic resin, is mounted in the center of casing for rotation on the shaft 8.

Figure 3A:
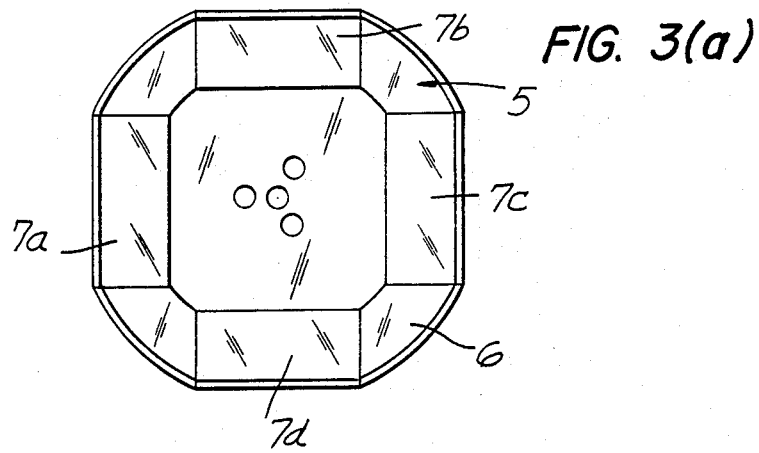
FIG. 3a is a plan view of a preferred form of a rotating mirrors optical block of the present invention.

As shown in FIG. 3a, the optical block 6 illustrated includes four non-reflecting surfaces 5 and four flat mirrors 7a, 7b, 7c and 7d having optically planar reflective surfaces, symmetrically disposed about the shaft 8. As the mirrors 7 rotate with the spindle 8, in unison therewith, they deflect the incoming light and also an angular scan. While the number of mirrors shown is four mirrors, all that is required is two and the number need not be so limited. For example, 6, 7, 8, 9, 10, 11, 12 mirrors or even a greater number might be advantageously employed. To obtain optimal reflectance the mirrors 7a–d are preferably formed by polishing the corresponding surfaces of the optical block 6 at an angle of 45 degrees to the shaft 8.

Figure 3B:
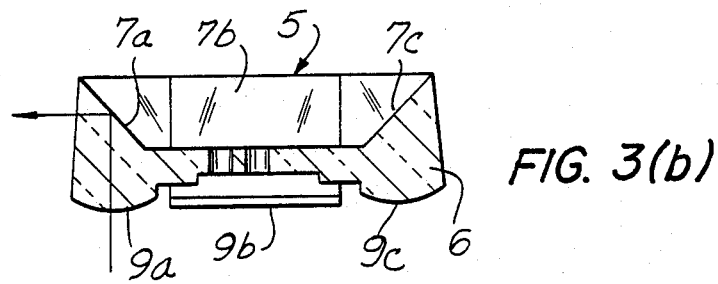
Figure 4:
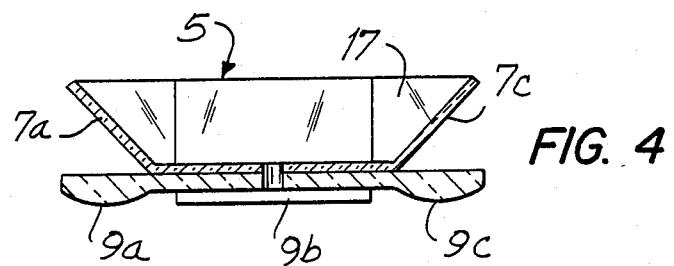
FIG. 4 is another embodiment of the rotating mirrors optical block of the present invention.

As can be seen by reference to FIGS. 3b and 4, on the lower surface of optical block, 6 are located lenses 9a, 9b and 9c. (A fourth lens in association with mirror 7d and identified herein as 9d is also mounted on optical block 6, but is not shown in the figures.) Each lens 9a–9d is associated with and in correspondence to a respective one of the mirrors 7a–7d.

Referring to FIG. 2, the light source is shown as a light emitting diode 10. Typically, the light source employed in hand-held scanning devices is a generator of a laser beam. Mounted on diode 10 is a collimating lens 11, which lies beneath the rotating mirrors 7a–7d. The collimating lens 11 condenses the incident light from diode 10 and yields parallel refracted beams onto the mirrors 7a–7d, respectively, through the associated lenses.

Located directly behind the transparent protective window 2 is a toric lens 12. A light sensing element 13 is positioned at the focal point of toric lens 12.

The beams emitted from the light emitting diode 10, are directed through the associated lens to the respective rotating mirrors 7a–d, which are rotated at high speed by the motor 4. The beams are then reflected by the mirrors 7a–d and directed toward the protective window 2 as a sweep or scanning beam. When four (4) mirrors are employed, the motor speed of 600 RPM permits 40 scans per second in total, or 10 scans per mirror 7a–d, inclusive.

The collimating lens 11, condenses the light beams from the light emitting diode 10, and directs parallel beams onto the lenses 9a–d, with the focal planes of the scanning beams dependent upon the focal lengths of the lenses 9a–d.

The focal length of each of the lenses 9a–d illustrated is different. Therefore, the location of the images of the beams that reflect off the rotating mirrors, are also different. For example, if the device of the present invention can correctly recognize as in focus an image having a depth of field in the range of plus or minus 10 mm without an error, the optical arrangement of lenses and mirrors can be selectd so as to be spaced at 20 mm intervals. Thus, in the case of four reflective surfaces and their associated lenses, a total distance of 80 mm will be covered. Because the light sensor element 13, recognizes the reflected light beam which yields the clearest electronic signal as being valid, the reflectance from locations not within the proper depth of field will not be read.

Figure 5:
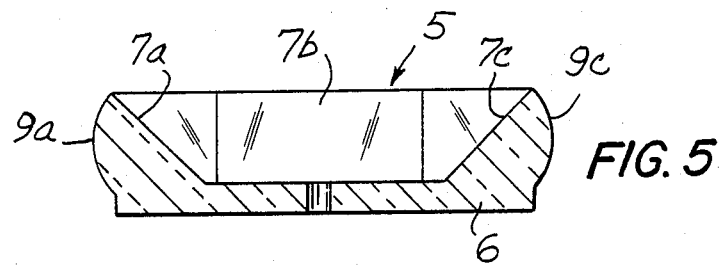
FIG. 5 is still another embodiment of the rotating mirrors optical block of the present invention.

The positioning of the lenses 9a–d, relative to the mirrors 7a–d, can be of different forms as shown in FIGS. 4 and 5. The optical lenses 9a–d, can be arranged beneath the mirrors 7a–d as shown in FIG. 4, or between the mirrors and the object to be read as shown in FIG. 5. Convex or concave lenses can be used with equal effect. The light reflected off the bar code pattern can take the same path as the scanning beams if, for example a beam splitter (not shown) is interposed between the light emitting diode 10 and the mirrors 7. In this manner, the light-sensor 13 can receive the light signal from the pattern.

As further illustrated in FIG. 1, supplemental reference indicia to assure that the laser beams are sighted along the bar code system can also be provided. For example, a pair of light emitting diodes 14 can be provided which emit visible light. This visible light will be seen on the target bar code symbol being read by the scanner and will serve to assure the user that the elevation or line of sight is correct. While the correct distance for a proper depth of field will not be known, the varied optical reflective surface aspects of the present invention as hereinbefore described provide this benefit.

The terms and expressions which have been employed are used as terms of description and not of limitation, and there is no intention in the use of such terms and expressions of excluding any equivalent of the features shown and described or any portions thereof, but it is recognized that various modifications are possible within the scope of the invention claimed.

What is claimed is:

1. A bar-code scanning device including a rotor rotatable about a fixed axis, and at least two mirrors carried by said rotor and positioned to provide sequential reflected scanning sweeps of a light-beam directed towards said mirrors;

the improvement comprising a lens associated with at least one of said mirrors, and rotatable in unison therewith for modifying the focal point and depth of field of said light beam when reflected by the associated said mirror.

2. The bar-code sensing device according to claim 1, including a lens associated with each said mirror, each said lens providing a focal point and depth of field of said light beam when reflected by the associated mirror which is different from the focal point and depth of field provided by each other said lens and its associated mirror.

3. The bar-code scanning device according to claim 1, in which said lens is positioned in advance of said mirror in the path of said light beam reaching said mirror.

4. The bar-code scanning according to claim 1 in which said lens is positioned beyond said mirror in the path of said light beam reflected by said mirror.

5. A bar-code scanning device including a rotor rotatable about a fixed axis, and at least two mirrors carried by said rotor and positioned to provide sequential reflected scanning sweeps of a light beam directed towards said mirrors;

the improvement comprising each said mirror being formed integrally as a surface of an optical block rotatable about said fixed axis by a drive motor; and, a lens associated with at least one of said mirrors and rotatable in unison therewith for modifying the focal point and depth of field of said light beam when reflected by the associated said mirror.

6. The bar-code scanning device of claim 5, including a plurality of said mirrors each formed integrally as surfaces of said optical block, and a said lens associated with each said mirror, each said lens providing a focal point and depth of field of said light beam reflected by the associated said mirror which is different from the focal point and depth of field of said light beam when reflected by each other said mirror.

7. The bar-code scanning device of claim 5, in which said mirrors are formed integrally one with the other as a sub-assembly, and said lens is formed separately, and attached to said sub-assembly.

8. The bar-code scanning device of claim 5, in which said lens is formed integrally with said mirrors as a unitary optical block.

9. The bar-code scanning device of claim 5, in which said lens is positioned in advance of the associated said mirror in the path of said light beam reaching said mirror.

10. The bar-code scanning device of claim 5, in which said lens is positioned beyond the associated said mirror in the path of said light beam reflected by said mirror.

* * * * *